United States Patent
Witte et al.

(10) Patent No.: US 9,186,842 B2
(45) Date of Patent: Nov. 17, 2015

(54) METHOD AND DEVICE FOR MANUFACTURING A DRY TEXTILE PREFORM

(71) Applicant: AIRBUS OPERATIONS GMBH, Hamburg (DE)

(72) Inventors: Tassilo Witte, Stade (DE); Jan Huelnhagen, Aachen (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 14/055,162

(22) Filed: Oct. 16, 2013

(65) Prior Publication Data

US 2014/0102627 A1   Apr. 17, 2014

Related U.S. Application Data

(60) Provisional application No. 61/714,754, filed on Oct. 17, 2012.

(30) Foreign Application Priority Data

Oct. 17, 2012 (EP) .................................. 12188783

(51) Int. Cl.
| | |
|---|---|
| *B29C 53/04* | (2006.01) |
| *B29B 11/16* | (2006.01) |
| *B29L 31/00* | (2006.01) |
| *B29D 99/00* | (2010.01) |

(52) U.S. Cl.
CPC .............. *B29C 53/043* (2013.01); *B29B 11/16* (2013.01); *B29D 99/0007* (2013.01); *B29L 2031/001* (2013.01); *B29L 2031/7739* (2013.01); *Y10T 156/1008* (2015.01)

(58) Field of Classification Search
CPC ..... B29C 53/043; B29B 11/16; B29D 99/0007
See application file for complete search history.

(56) References Cited

U.S. PATENT DOCUMENTS

| | | | |
|---|---|---|---|
| 5,394,906 A | 3/1995 | Farley | |
| 8,662,873 B2 * | 3/2014 | Winter et al. | 425/112 |
| 8,668,796 B2 * | 3/2014 | Niefnecker | 156/71 |

FOREIGN PATENT DOCUMENTS

| | | |
|---|---|---|
| DE | 10 2009 008329 | 8/2010 |
| DE | 10 2010 014 704 | 10/2011 |

(Continued)

OTHER PUBLICATIONS

European Search Report for Application No. EP 12 18 8783 dated Mar. 18, 2013.

(Continued)

*Primary Examiner* — James Mackey
(74) *Attorney, Agent, or Firm* — Jenkins, Wilson, Taylor & Hunt, P.A.

(57) ABSTRACT

Method for manufacturing a dry textile preform, including: pulling a textile fabric sheet; grabbing a first side portion of the sheet between rollers, the rollers forming a first flange of the first side portion of the sheet inclined at a predeterminable angle to the plane of extension of the sheet; grabbing a second side portion of the sheet opposite to the first side portion between other rollers, the other rollers forming a second flange of the second side portion of the sheet inclined at a predeterminable angle to the plane of extension of the sheet; adjusting a difference between the rolling speed of the pair of first rollers and the rolling speed of the pair of second rollers to form a curvature radius of the sheet; and adjusting distance between the rollers perpendicular to the movement direction of the sheet to form a web portion between the first flange.

7 Claims, 3 Drawing Sheets

(56) References Cited

FOREIGN PATENT DOCUMENTS

| | | |
|---|---|---|
| EP | 2 374 607 | 10/2011 |
| WO | WO 2007/007417 | 1/2010 |

OTHER PUBLICATIONS

Reinhold, R.: "Preformfertigung—Automatisches Handling für effiziente Anlagen", Maschinenmarkt, Composites World, Apr. 2011.

* cited by examiner

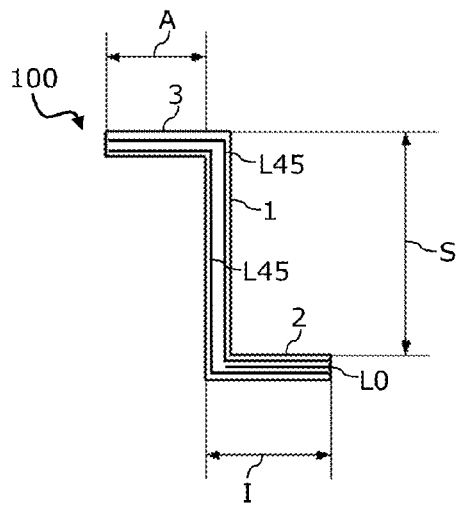
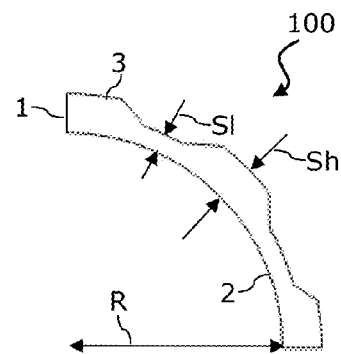
Fig. 1                Fig. 2
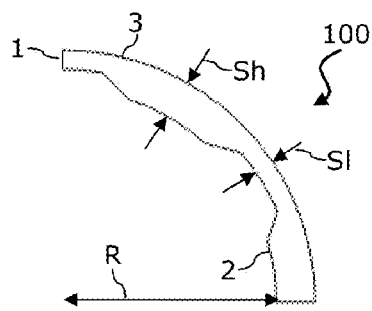
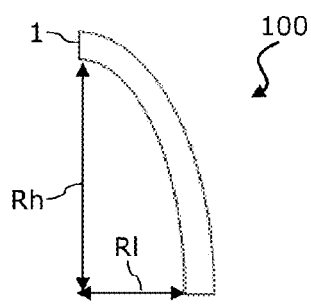
Fig. 3                Fig. 4
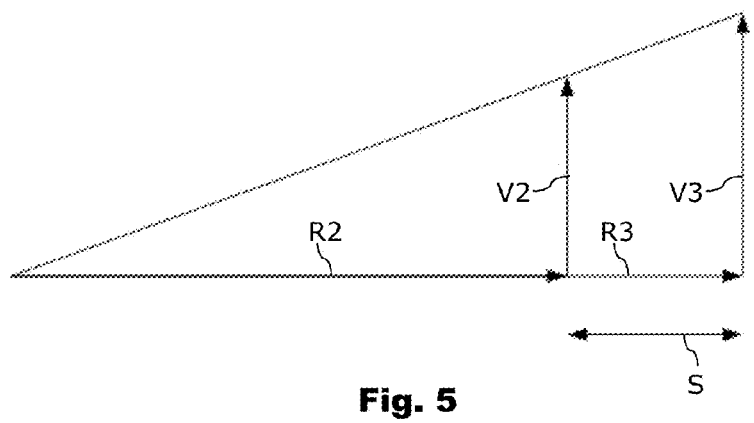
Fig. 5

METHOD AND DEVICE FOR MANUFACTURING A DRY TEXTILE PREFORM

CROSS-REFERENCES TO RELATED APPLICATIONS

The present application claims benefit of and priority to the European Patent Application No. 12 188 783.0, filed Oct. 17, 2012, and of the U.S. Provisional Application No. 61/714, 754, filed Oct. 17, 2012, the entire disclosures of which are both incorporated herein by reference.

FIELD OF THE INVENTION

The present invention pertains to a method and a device for manufacturing a dry textile preform, in particular for use in the manufacturing of carbon fiber based structural profiles (e.g. frames) and/or formers for airborne vehicle.

Although the present invention may be applicable for any aircraft or spacecraft, it will be explained in conjunction with formers for an aircraft.

BACKGROUND

When manufacturing fiber composite components for avionics mainly prepregs are used, for example fiber fabric or weave preimpregnated with a matrix material such as an epoxy. Instead of prepregs resin transfer molder (RTM) in combination with a preform from dry fiber material may be used. A dry preform, i.e. a preform not having been impregnated with a matrix material before, is shaped into the desired shape and only afterwards impregnated with matrix material.

A method and a device for manufacturing of preforms is described in DE 10 2010 014 704 A1. In a first step continuously fed fiber layers are shaped at a right angle in a predefined manner. The resulting shaped profile is then bent in a longitudinal direction in a predefined manner.

The document Reinhold, R.: "Preformfertigung—Automatisches Handling für effiziente Anlagen", Maschinenmarkt, Composite World, April 2011 discloses a composite handling system that utilizes a preforming tool to shape a dray fiber fabric into a desired preform shape.

SUMMARY

It is one idea of the present invention to provide a method and a device for producing dry textile preforms with curved longitudinal profiles and varying cross-section which allow for a high throughput and a high flexibility with regard to shapes and sizes of the preforms.

According to a first aspect of the invention, a method for manufacturing a textile preform comprises pulling a textile fabric sheet from a creel; grabbing a first side portion of the fabric sheet between a pair of first rollers, the pair of first rollers forming a first flange of the first side portion of the fabric sheet inclined at a predeterminable angle to the plane of extension of the fabric sheet; grabbing a second side portion of the fabric sheet opposite to the first side portion between a pair of second rollers, the pair of second rollers forming a second flange of the second side portion of the fabric sheet inclined at a predeterminable angle to the plane of extension of the fabric sheet; adjusting a difference between the rolling speed of the pair of first rollers and the rolling speed of the pair of second rollers to form a curvature radius of the fabric sheet, which curvature radius depends on the extent of the adjusted difference; and adjusting the distance between the pair of first rollers and the pair of second rollers perpendicular to the movement direction of the fabric sheet to form a web portion between the first flange and the second flange, the web portion height depending on the adjusted distance.

According to a second aspect of the invention, a device for manufacturing a textile preform comprises a creel comprising a textile fabric sheet wound up on the creel; a pair of first rollers being configured to grab a first side portion of the fabric sheet between the first rollers and to form a first flange of the first side portion of the fabric sheet being pulled from the creel inclined at a predeterminable angle to the plane of extension of the fabric sheet; and a pair of second rollers being configured to grab a second side portion of the fabric sheet opposite to the first side portion between the second rollers and to form a second flange of the second side portion of the fabric sheet inclined at a predeterminable angle to the plane of extension of the fabric sheet, wherein the rolling speed of the pair of first rollers and the rolling speed of the pair of second rollers is adjustable to form a curvature radius of the fabric sheet, which curvature radius depends on the extent of the adjusted difference between the rolling speeds of the pairs of first and second rollers, and wherein the pair of first rollers and/or the pair of second rollers are movable along a distance vector perpendicular to the movement direction of the fabric sheet to form a web portion between the first flange and the second flange, the web portion height depending on the distance between the pairs of first and second rollers.

One main idea of the present invention is to provide pairs of rollers which may on one hand be moved relative to each other to form flanges which are spaced apart with a variable distance in order to form a web portion of variable web height for the preform. On the other hand, the turning speed of the pairs of rollers may be set independently of each other so that the preform may be formed into a curved shape, the curvature radius lying in the plane of extension of the fabric sheet and being variable depending on the difference in turning speeds of the respective pairs of rollers.

For such a method, dry—i.e. matrix-free—textile fiber fabrics may be used as fabric sheets wound up on a creel. The preforms may be formed in a continuous process without the need for preforming moulds. This has the advantage that the geometry of the final preform, i.e. the curvature radius of its bent shape as well as the height of the web portion may be individually set without having to provide a different mould for different desired shapes, speeding up the manufacturing process greatly.

Moreover, the preform production process may be advantageously automated with high reproducibility and high throughput. The raw materials are much easier to be handled, since only dry fiber fabrics instead of prepregs have to be used. One device may be utilized for the manufacturing of preforms having a multitude of different outer geometries without the need to modify the whole manufacturing device.

According to an embodiment of the first aspect of the invention, the first flange extends into an opposite direction to the second flange with respect to the plane of extension of the fabric sheet. Alternatively, the first flange extends into the same direction with respect to the plane of extension of the fabric sheet as the second flange. That way, Z-shaped or C-shaped preforms may be both formed using the same manufacturing process.

According to a further embodiment of the first aspect of the invention, the method further comprises temporarily tilting one or both pairs of first and second rollers around the axis parallel to the distance vector between the pairs of rollers when adjusting the distance between the pair of first rollers and the pair of second rollers. This provides the advantage that the fabric sheet does not need to slide between the rollers of the pairs of rollers when adjusting the web height of the preform. Instead, the tilting introduces a movement force by the rollers on the fabric sheet perpendicular to the pulling direction of the fabric sheet, enabling the manufacturing process to be steered more accurately. Another advantage pertains to the avoiding of warpage or buckles in the fabric sheet when shortening the web height of the preform.

According to a further embodiment of the first aspect of the invention, the method further comprises preforming the first flange and the second flange by preforming components, the preforming components being arranged between the creel and the pairs of first and second rollers. This may for example be done by guiding rollers or guiding plates which advantageously provides a better defined starting form of the flange portions leading to an optimized reproducibility and less stress on the fibers in the weave.

According to a further embodiment of the first aspect of the invention, the method further comprises providing the fabric sheet with binder material; and activating the binder material by applying heat during the flange and curvature radius forming procedure. After the forming of the fabric sheet has been completed the binder may cool down and fixate the preform for easier handling.

According to a further embodiment of the first aspect of the invention, the first side portion of the fabric sheet comprises a region comprising 0° fiber layers. Such 0° layers are advantageous for the stiffness and tensile strength of the final preforms. In particular, the 0° layers may be advantageously provided in the inner flange portion of a preform.

According to a further embodiment of the first aspect of the invention, the grabbing pressure applied to the fabric sheet by the pair of first rollers is set larger than the grabbing pressure applied to the fabric sheet by the pair of second rollers. This renders it possible to steer the movement of the fabric sheet relative to the roller axis and to control the position of the fabric sheet with respect to excess portion extending from the flange portions when the web height is comparatively low. Advantageously, the grabbing pressure may be set such that there is no undesired warpage or buckling of the fabric sheet and that the excess portion will always protrude from the flange portion not comprising the 0° layers.

According to a further embodiment of the first aspect of the invention, the method further comprises concomitantly moving the creel comprising the fabric sheet in the same direction as the pair of first rollers, when adjusting the distance between the pair of first rollers and the pair of second rollers. This advantageously means that there are no unwanted torsional forces on the side portions of the fabric sheet when grabbing the fabric sheet with the movable rollers, particularly not at a side portion of the fabric sheet comprising the sensitive 0° fiber layers.

According to an embodiment of the second aspect of the invention, the first flange extends into an opposite direction to the second flange with respect to the plane of extension of the fabric sheet. Alternatively, the first flange extends into the same direction with respect to the plane of extension of the fabric sheet as the second flange. That way, Z-shaped or C-shaped preforms may be both formed using the same manufacturing device.

According to another embodiment of the second aspect of the invention, one or both pairs of first and second rollers are tiltable around the axis parallel to the distance vector between the pairs of first and second rollers. This provides the advantage that the fabric sheet does not need to slide between the rollers of the pairs of rollers when adjusting the web height of the preform. Instead, by tilting the pairs of rollers a movement force by the rollers on the fabric sheet may be introduced perpendicular to the pulling direction of the fabric sheet, enabling the manufacturing device to be steered more accurately. Another advantage pertains to the avoiding of warpage or buckles in the fabric sheet when shortening the web height of the preform.

According to another embodiment of the second aspect of the invention, the device further comprises preforming components being arranged between the creel and the pairs of first and second rollers, the preforming components being configured to preform the first flange and the second flange. The preforming components may for example be guiding rollers or guiding plates which advantageously provide a better defined starting form of the flange portions leading to an optimized reproducibility and less stress on the fibers in the weave.

According to a further embodiment of the second aspect of the invention, the first side portion of the fabric sheet comprises a region comprising 0° fiber layers. Such 0° layers are advantageous for the stiffness and tensile strength of the final preforms. In particular, the 0° layers may be advantageously provided in the inner flange portion of a preform.

According to a further embodiment of the second aspect of the invention, the grabbing pressures applied to the fabric sheet by the pair of first rollers and the pair of second rollers are adjustable independently of each other. This renders it possible to steer the movement of the fabric sheet relative to the roller axis and to control the position of the fabric sheet with respect to excess portion extending from the flange portions when the web height is comparatively low. Advantageously, the grabbing pressure may be set such that there is no undesired warpage or buckling of the fabric sheet and that the excess portion will always protrude from the flange portion not comprising the 0° layers.

According to a further embodiment of the second aspect of the invention, the creel is movable into a direction of the distance vector between the pair of first rollers and the pair of second rollers. This advantageously means that there are no unwanted torsional forces on the side portions of the fabric sheet when grabbing the fabric sheet with the movable rollers, particularly not at a side portion of the fabric sheet comprising the sensitive 0° fiber layers.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 1 shows a Z-former for an airborne vehicle in cross section according to an embodiment of the invention.

FIG. 2 shows a Z-former for an airborne vehicle in top view according to another embodiment of the invention.

FIG. 3 shows a Z-former for an airborne vehicle in top view according to yet another embodiment of the invention.

FIG. 4 shows a Z-former for an airborne vehicle in top view according to yet another embodiment of the invention.

FIG. 5 shows a vector diagram for adjusting the roller speed of a device for manufacturing textile preforms according to yet another embodiment of the invention.

DETAILED DESCRIPTION

Figure 6:
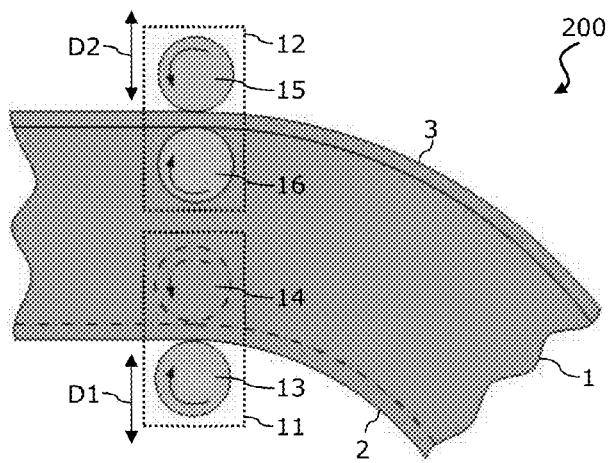
FIG. 6 shows a schematic detail of a device for manufacturing textile preforms according to yet another embodiment of the invention.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 schematically illustrates a Z-shaped textile fiber preform 100 used in manufacturing Z-shaped formers or stringers for avionics. The textile fiber preform 100 comprises a web portion 1 having a web portion height S, an inner flange 2 having an inner flange width I and an outer flange 3 having an outer flange width A. The inner flange 2 and the outer flange 3 are bent side portions of a fabric sheet, the lateral extension of which points into the drawing plane. Exemplarily, the following description is explained with respect to Z-shaped preforms 100 as shown in FIG. 1, however other preform shapes, such as C-shapes or U-shapes are possible as well. Generally, the flange portions 2 and 3 may be inclined at an angle with respect to the plane of extension of the fabric sheet. The angle may for example be 90°, however, other angles larger than 0°, in particular larger than 15° in particular larger than 30°, in particular larger than 45°, in particular larger than 60°, in particular larger than 75° may be possible as well. It may also be possible to predetermine angles under which the respective flanges 2 and 3 are inclined to the web portion 1 which are different from each other. For example, the inner flange 2 might be inclined at an angle of 90° with respect to the web portion 1, while the outer flange might be inclined at an angle of less than 90° with respect to the web portion 1.

The preform 100 may be a textile preform made from a fiber weave or fabric sheet. In particular, the fabric sheet may comprise carbon fibers or other textile fibers and may particularly be a non-crimp fabric. Such non-crimp fabric may for example include multiple layers of fibers of which three layers L0 and L45 are exemplarily shown in FIG. 1. The number of layers included in fabric sheet is arbitrary, and any number of different fiber layers may be used. Each of the fiber layers may comprise fibers which are arranged in a predefined fiber orientation. The fiber layers may for example be stitched together. As exemplarily shown in FIG. 1, the fiber layer L0 may be a 0° fiber layer, i.e. the fibers are oriented substantially in parallel to the reeling direction of the fiber sheet. On the other hand, the fiber layers L45 may comprise fibers oriented substantially under a 45° angle to the reeling direction of the fiber sheet.

The fiber layer L0 may be sandwiched between two of the fiber layers L45 in order to provide for additional tensile strength and stiffness of the preform 100. In particular, the L0 fiber layer may only be included in one side portion of the fabric sheet such that the L0 fiber layer is only included in inner flange 2 of the preform 100.

The preform 100 may be a dry preform, i.e. the preform 100 does not include a matrix material. However, the textile preform 100 may comprise a thermosetting binder, for example a powdered thermoplastic binder. The binder may be susceptible to the application of heat and melt upon heating the fabric sheet, for example by infrared radiation. After forming the preform 100 may cool down, thus solidifying the binder and fixing the preform 100 in the desired shape.

The preform 100 may for example be infused with a matrix material by way of a suitable epoxy infusion process, in particular by means of a resin transfer molding process (RTM). The matrix material may for example be thermosetting duroplastic or a thermoplastic material. The preform 100 may be used as initial fiber composite feedstock for the manufacturing of fiber composite components, in particular for use in avionics. For example, the preform 100 may be used for the manufacturing of formers, frames and stringers, or parts of such components which may be designed to reinforce the fuselage of an airborne vehicle such as an aircraft or a spacecraft.

FIGS. 2 to 4 show schematic illustrations of different variations of textile preforms 100 in top view. The preforms 100 each comprises a web portion 1, an inner flange 2 and an outer flange 3. The preforms 100 of FIGS. 2 and 3 are each bent in a curvature profile with a constant curvature radius R. The preform 100 of FIG. 4 is bent in a curvature profile with linearly changing curvature radius from a low curvature radius Rl to a high curvature radius Rh. Such a preform thus has an elliptical shape with a constant web portion height S.

The preforms 100 of FIGS. 2 and 3, however, have a variable web portion height S which varies between a low web portion height Sl and a high web portion height Sh. For the preform 100 in FIG. 2 the outer flange radius changes while the inner flange radius is kept constant. For the preform 100 in FIG. 3 the outer flange radius is kept constant while the inner flange radius is changed.

It will be obvious that each of the variation principles for preforms 100 as shown in conjunction with FIGS. 2 to 4 may be combined in order to achieve a multitude of preforms 100 with differing shapes in terms of curvature profile and web portion height. It is undesirable to provide a single tool for each of the different combination possibilities. Rather, a continuous and uniform manufacturing method and device are desired to create all the different variations or preforms 100 with a single flexible manufacturing process.

As exemplarily shown in the schematic illustration of FIG. 6, the general idea of the invention is to provide a creel comprising a textile fabric sheet wound up on the creel. The textile fabric sheet may be unreeled from the reel in a first unreeling direction. A pair of rollers 11 and 12 provided on each side of the fabric sheet is configured to grab a respective side portion of the fabric sheet between the rollers 13 and 14 or 15 and 16. The rollers 13, 14, 15 and 16 comprise a roller axis standing at an angle with respect to the plane of extension of the fabric sheet, in particular at a right angle to the plane of extension of the fabric sheet. The pairs of rollers 11 and 12 are mounted in parallel to each other and spaced apart to guide the fabric sheet through the rollers 13, 14, 15 and 16 in each case. The roller axes of the rollers 13, 14, 15 and 16 may be inclined at such a predetermineble angle with respect to the plane of extension of the fabric sheet that the desired angle of the flange portions 2 and 3 as described in conjunction with FIG. 1 may be achieved. The predeterminable angle may for example be 90°, however, other angles larger than 0°, in particular larger than 15° in particular larger than 30°, in particular larger than 45°, in particular larger than 60°, in particular larger than 75° may be possible as well.

Both of the roller pairs 11 and 12 are thus configured to form a flange 2 and 3 of the respective side portions of the fabric sheet being pulled from the creel, each flange 2 and 3 standing or being inclined at a predeterminable angle to the plane of extension of the fabric sheet. In the case of Z-shaped preforms, the flanges 2 and 3 are formed perpendicular to the plane of extension of the fabric sheet.

The rolling speed of the pairs of rollers 11 and 12 is adjustable in each case, independently of the rolling speed of the respective other pair of rollers. That way, the rollers 11 and 12 are configured to form a curvature radius of the fabric sheet, which curvature radius depends on the extent of the adjusted difference between the rolling speeds of the pairs of rollers 11 and 12. In the example of FIG. 6, the rolling speed of the pair of rollers 12 may be set higher than the rolling speed of the pair of rollers 11, therefore forcing the fabric sheet to bend downwards in the FIG. creating a curvature profile with the flange 2 being the inner flange of the profile and the flange 3 being the outer flange of the profile.

The relative difference in rolling or turning speed of the two roller pairs 11 and 12 may be varied during the forming process, thereby continuously forming a preform with a radius that varies over the length.

As depicted in the exemplary vector diagram of FIG. 5, the formed radius is defined by the difference in rolling speed between the pairs rollers. The curvature radius of the inner flange 2 is denoted as R2, the curvature radius of the outer flange 3 is denoted as R3, the rolling speed of the inner flange roller pair is denoted as V2 and the rolling speed of the outer flange roller pair is denoted as V3. The difference between the radiuses of the inner and outer flange is denoted as S which corresponds to the respective web portion height. In this case, the curvature radius of the inner flange 2 may be adjusted according to the formula $$R2 = V2 * S / (V3 - V2).$$

Accordingly, the curvature radius of the inner flange 2 may be adjusted according to the formula $$R3 = V3 * S (V3 - V2).$$

Figure 7:
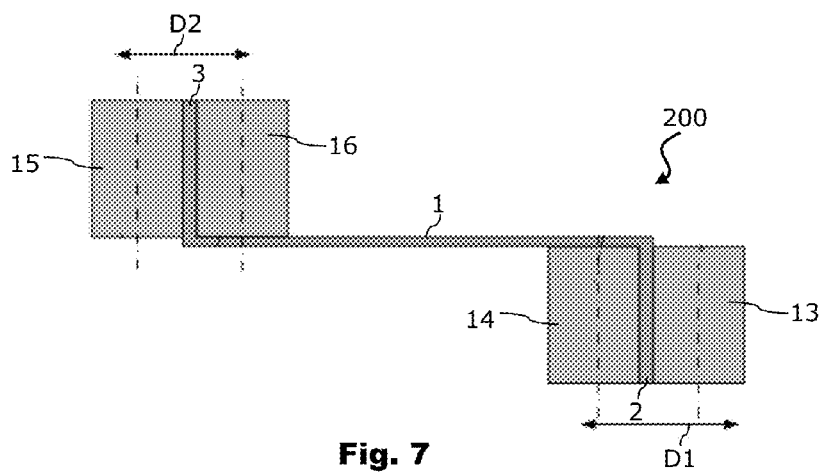
FIG. 7 shows a schematic detail of a device for manufacturing textile preforms according to yet another embodiment of the invention.

FIG. 7 shows a schematic illustration of the technical details of the device 200 in FIG. 6 in a corresponding side view. The pair 11 of first rollers 13 and 14 may be movable in a movement direction D1 parallel to the plane of extension of the fabric sheet. Similarly, the pair 12 of second rollers 15 and 16 may be movable in a movement direction D2 parallel to the plane of extension of the fabric sheet and parallel to the movement direction D1. By moving one or both of the pairs 11 and 12 of rollers towards each other or away from each other, the web portion height S of the web portion 1 may be changed. Depending on the amount of movement along the movement directions D1 and D2, the web portion height S may be changed depending on the distance between the pairs 11 and 12 of rollers. The movement directions D1 and D2 are in particular perpendicular to the movement direction of the fabric sheet when pulling the fabric sheet from a creel.

Figure 8:
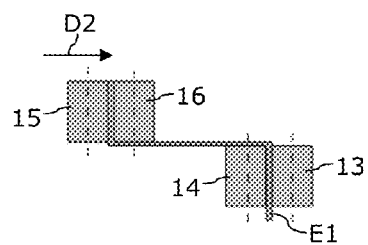
FIG. 8 shows a schematic detail of a device for manufacturing textile preforms according to yet another embodiment of the invention.
Figure 9:
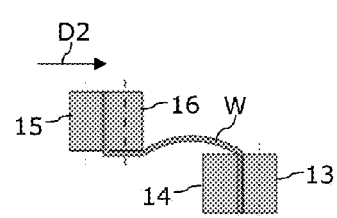
FIG. 9 shows a schematic detail of a device for manufacturing textile preforms according to yet another embodiment of the invention.
Figure 10:
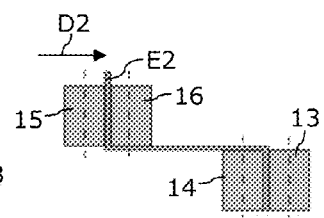
FIG. 10 shows a schematic detail of a device for manufacturing textile preforms according to yet another embodiment of the invention.

FIGS. 8, 9 and 10 shows possible intermediate outcomes of the manufacturing process when moving the pair of rollers 15 and 16 towards the pair of rollers 13 and 14 in the movement direction D2. Initially, it is assumed that the overall width of the fabric sheet equals the sum of the previous web portion height S of the web portion 1 and the length of the inner and outer flanges 2 and 3. The overall width of the fabric sheet does not change, therefore the excess width of the fabric will have to move somewhere when shortening the web portion width S. As shown in FIGS. 8 and 10, the fabric sheet may glide through the rollers 13 and 14 or 15 and 16, respectively, leaving the web portion 1 in a straight, but shortened line. Depending on the grabbing pressure applied by the pairs of rollers onto the fabric sheet, the excess width of the fabric sheet will show as excess portion E1 at the inner flange 2 (example of FIG. 8) or as excess portion E2 at the outer flange 3 (example of FIG. 10).

The situation of FIG. 9 where the web portion 1 warps or buckles having a bulge or warpage W deviating from the linear extension of the web portion 1 is generally undesirable. Which of the outcomes of FIGS. 8 and 10 is to be achieved, mainly depends on the preferred profile of the preform 100. In any case, the grabbing pressures applied to the fabric sheet by the pair 11 of first rollers 13 and 14 and the pair 12 of second rollers 15 and 16 are adjustable independently of each other.

Figure 11:
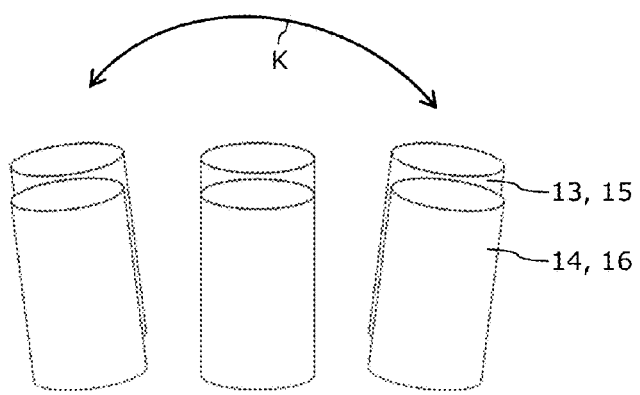
FIG. 11 shows a schematic detail of a device for manufacturing textile preforms according to yet another embodiment of the invention.

In order to aid the movement of the flange portions 2 and 3 perpendicular to the unreeling direction of the fabric sheet, one or both pairs 11 and 12 of rollers may be tiltable in a tilting direction K around the axis parallel to the distance vector between the pairs 11 and 12 of rollers, exemplarily shown in FIG. 11. By temporarily tilting one or both pairs 11 and 12 of rollers around this axis, a partial force acts upon the fabric sheet in a perpendicular direction to the unreeling direction of the fabric sheet, thus forcing the fabric sheet out of the rollers or deeper between the rollers on the tilted side. This additionally provides the advantage that the fabric sheet will not have to slide between the rollers, providing a higher accuracy in adjusting the web portion height S. Moreover, the production quality of the process may be optimized due to relieving the fabric sheet and particularly the fiber layers in the sheet from shearing stress.

Figure 12:
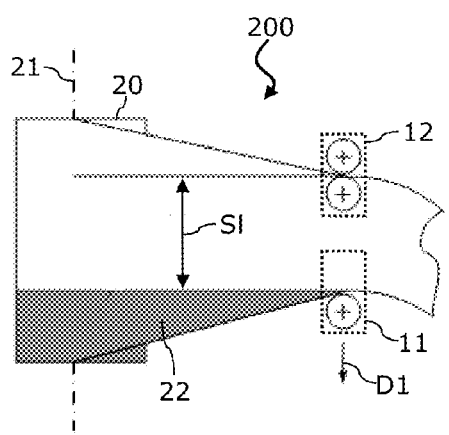
FIG. 12 shows a schematic detail of a device for manufacturing textile preforms according to yet another embodiment of the invention.

FIG. 12 shows a schematic illustration of a device 200 for manufacturing a textile preform, such as the preform 100 shown in conjunction with FIGS. 1 to 4. A creel 20 is provided with a wound up fabric sheet. The creel 20 may rotate around a creel axis 21 unwinding the fabric sheet in a continuous and controlled motion. A lower side portion 22 of the fabric may include a 0° fiber layer. Such a layer may be integrated into the formation of an inner flange 2 by a pair 11 of rollers.

The distance between the pairs 11 and 12 of rollers is set to a lower web portion height S1 as shown in FIG. 12. Optionally, the device may further comprise preforming components (not explicitly shown) being arranged between the creel 20 and the pairs 11 and 12 of rollers. The preforming components may for example comprise additional sets of rollers or guiding plates, being configured to preform the first flange 2 and the second flange 3. The preforming components may in particular stabilize the manufacturing process and provide reproducible starting conditions for the formation of the inner flange 2 and the outer flange 3.

Figure 13:
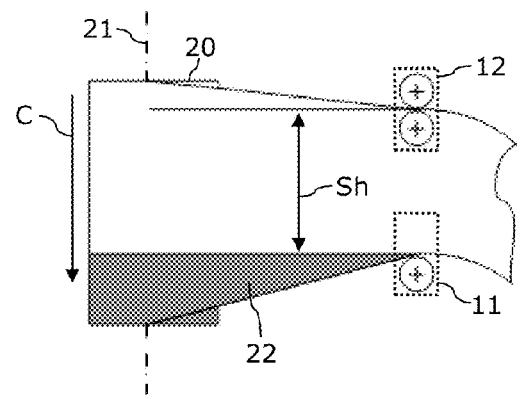
FIG. 13 shows a schematic detail of a device for manufacturing textile preforms according to yet another embodiment of the invention.

The creel 20 may be movable into a direction C of the distance vector between the pairs 11 and 12 of rollers, as shown exemplarily in FIG. 13. This may be particularly useful, when moving the creel 20 concomitantly with the movement of the pair 11 of rollers. Thereby, the width of the side portion 22 comprising the 0° fiber layers is kept constant with respect to the alignment of the pair 11 of rollers to the edges of the fabric sheet, minimizing the shearing stress on the sensitive 0° fiber layers in an advantageous manner.

Figure 14:
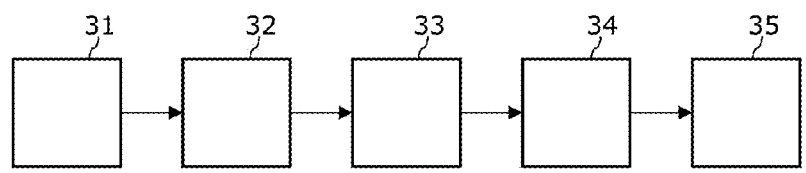
FIG. 14 shows a schematic block diagram of a method for manufacturing textile preforms according to yet another embodiment of the invention.

FIG. 14 shows a schematic block diagram illustrating a method for manufacturing a textile preform, in particular a textile preform 100 as exemplarily explained in conjunction with FIGS. 1 to 4. The method may be implemented on a device 200 for manufacturing a textile preform as shown in FIGS. 6 to 13. The method comprises at 31 pulling a textile fabric sheet from a creel. At 32, a first side portion of the fabric sheet is grabbed between a pair of first rollers, the pair of first rollers forming a first flange of the first side portion of the fabric sheet inclined at a predeterminable angle to the plane of extension of the fabric sheet. Similarly, at pair of second rollers is grabbed, the pair of second rollers forming a second flange of the second side portion of the fabric sheet inclined at a predeterminable angle to the plane of extension of the fabric sheet.

At 34, a difference between the rolling speed of the pair of first rollers and the rolling speed of the pair of second rollers is adjusted to form a curvature radius of the fabric sheet, which curvature radius depends on the extent of the adjusted difference. The difference in rolling or turning speed of the roller pairs may be varied during the manufacturing process, thereby continuously forming a preform with a radius that varies over the length.

Finally, and concomitantly with the adjusting of the rolling speeds of the pairs of rollers, at 35, the distance between the pair of first rollers and the pair of second rollers perpendicular to the movement direction of the fabric sheet is adjusted to form a web portion between the first flange and the second flange, the web portion height depending on the adjusted distance.

What is claimed is:

1. A device for manufacturing a textile preform, the device comprising:
   a creel comprising a textile fabric sheet wound up on the creel;
   a pair of first rollers being configured to grab a first side portion of the fabric sheet between the first rollers and to form a first flange of the first side portion of the fabric sheet being pulled from the creel inclined at a predeterminable angle to the plane of extension of the fabric sheet; and
   a pair of second rollers being configured to grab a second side portion of the fabric sheet opposite to the first side portion between the second rollers and to form a second flange of the second side portion of the fabric sheet inclined at a predeterminable angle to the plane of extension of the fabric sheet,
   wherein the rolling speed of the pair of first rollers and the rolling speed of the pair of second rollers is adjustable to form a curvature radius of the fabric sheet, which curvature radius depends on the extent of the adjusted difference between the rolling speeds of the pairs of first and second rollers, and
   wherein the pair of first rollers and/or the pair of second rollers are movable along a distance vector perpendicular to the movement direction of the fabric sheet to form a web portion between the first flange and the second flange, the web portion height depending on the distance between the pairs of first and second rollers.

2. The device according to claim 1, wherein the first flange extends into an opposite direction to the second flange with respect to the plane of extension of the fabric sheet.

3. The device according to claim 1, wherein one or both pairs of first and second rollers are tiltable around the axis parallel to the distance vector between the pairs of first and second rollers.

4. The device according to claim 1, further comprising:
   preforming components being arranged between the creel and the pairs of first and second rollers, the preforming components being configured to preform the first flange and the second flange.

5. The device according to claim 1, wherein the first side portion of the fabric sheet comprises a region comprising 0° fiber layers.

6. The device according to claim 1, wherein the grabbing pressures applied to the fabric sheet by the pair of first rollers and the pair of second rollers are adjustable independently of each other.

7. The device according to claim 1, wherein the creel is movable into a direction of the distance vector between the pair of first rollers and the pair of second rollers.

* * * * *